(12) United States Patent
Dotz

(10) Patent No.: US 11,601,025 B2
(45) Date of Patent: Mar. 7, 2023

(54) ROTOR FOR AN ELECTRIC MACHINE, ELECTRIC MACHINE FOR A VEHICLE, AND VEHICLE

(71) Applicant: VALEO SIEMENS EAUTOMOTIVE GERMANY GMBH, Erlangen (DE)

(72) Inventor: Boris Dotz, Munich (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 168 days.

(21) Appl. No.: 16/911,625

(22) Filed: Jun. 25, 2020

(65) Prior Publication Data

US 2020/0412188 A1 Dec. 31, 2020

(30) Foreign Application Priority Data

Jun. 27, 2019 (DE) ...................... 10 2019 117 364.7

(51) Int. Cl.
| | | |
|---|---|---|
| H02K 1/27 | (2022.01) | |
| B60K 1/00 | (2006.01) | |
| H02K 1/24 | (2006.01) | |
| H02K 1/276 | (2022.01) | |

(52) U.S. Cl.
CPC ............... *H02K 1/276* (2013.01); *B60K 1/00* (2013.01); *H02K 1/246* (2013.01)

(58) Field of Classification Search
CPC .......... B60K 1/00; H02K 29/03; H02K 1/246; H02K 1/2766; H02K 1/276; H02K 2213/03; H02K 2201/03
USPC ...................................................... 310/156.01
See application file for complete search history.

(56) References Cited

U.S. PATENT DOCUMENTS

| | | | | |
|---|---|---|---|---|
| 7,605,510 B2* | 10/2009 | Okuma | ................ | H02K 1/2766 310/156.56 |
| 7,906,882 B2* | 3/2011 | Okuma | .................. | H02K 1/276 310/156.56 |
| 7,932,658 B2* | 4/2011 | Ionel | ...................... | H02K 1/276 310/156.52 |
| 7,960,886 B2 | 6/2011 | Miura et al. | | |
| 9,059,621 B2 | 6/2015 | Aoyama | | |
| 9,172,279 B2* | 10/2015 | Sekiya | ................... | H02K 29/03 |
| 9,225,213 B2* | 12/2015 | Kimura | ............... | H02K 1/2766 |
| 10,003,227 B2 | 6/2018 | Jurkovic et al. | | |
| 2002/0175583 A1* | 11/2002 | Kikuchi | ................. | H02K 21/16 310/156.56 |

(Continued)

FOREIGN PATENT DOCUMENTS

| | | |
|---|---|---|
| DE | 112008001567 T5 | 8/2010 |
| DE | 102012219175 A1 | 5/2013 |
| DE | 102016105078 A1 | 9/2016 |

(Continued)

*Primary Examiner* — Alex W Mok
(74) *Attorney, Agent, or Firm* — Manabu Kanesaka

(57) ABSTRACT

A rotor for an electric machine, includes a rotor lamination stack divided into a plurality of sectors, in each of which there is arranged a permanent magnet assembly which comprises two permanent magnets positioned in a V-shape symmetrically with respect to a plane of symmetry dividing the sector into two half-sectors, wherein an outer radius of the rotor lamination stack in a particular sector has a pair of local minimum values, which are formed symmetrically to one another with respect to the plane of symmetry in a half-sector of the sector.

11 Claims, 4 Drawing Sheets

(56) References Cited

U.S. PATENT DOCUMENTS

Figure 1:
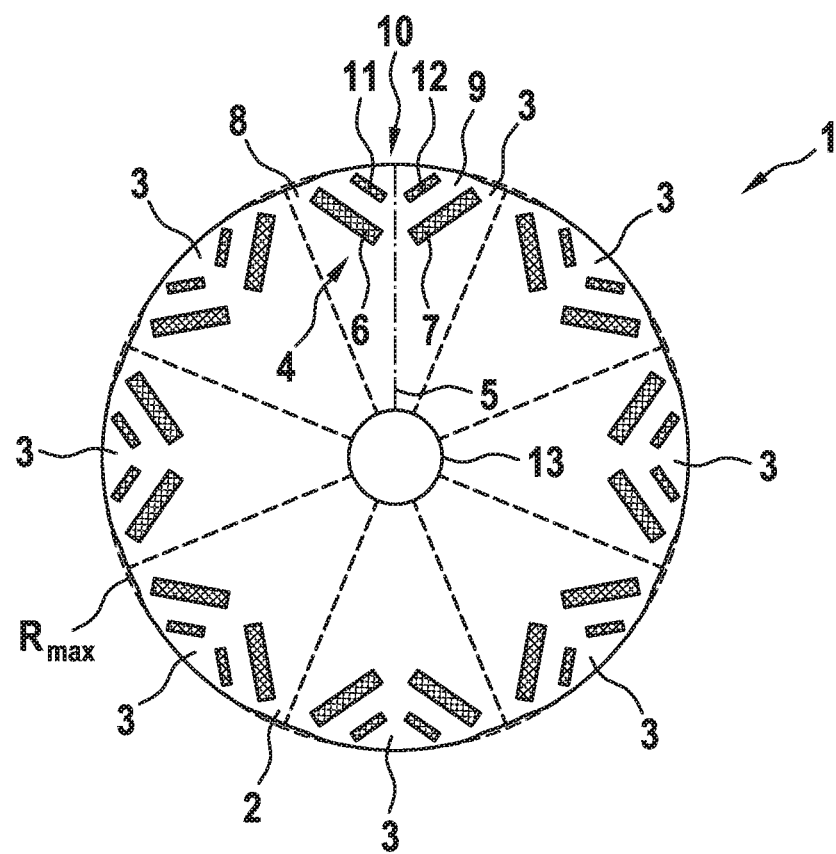

2006/0017345 A1* 1/2006 Uchida ................ H02K 1/2766
                                                310/156.56
2007/0145850 A1* 6/2007 Hsu ...................... H02K 1/2766
                                                310/191

FOREIGN PATENT DOCUMENTS

EP      1610444 A1 * 12/2005 ........... H02K 1/2766
JP      2002209350 A  *  7/2002

* cited by examiner

ROTOR FOR AN ELECTRIC MACHINE, ELECTRIC MACHINE FOR A VEHICLE, AND VEHICLE

RELATED APPLICATIONS

The present application is based on, and claims priority from, German Application No. DE 10 2019 117 364.7 filed Jun. 27, 2019, the disclosure of which is hereby incorporated by reference herein in its entirety.

The present invention relates to a rotor for an electric machine, comprising a rotor lamination stack divided into a number of sectors, in each of which there is arranged a permanent magnet assembly which comprises two permanent magnets positioned in a V shape symmetrically with respect to a plane of symmetry dividing the sector into two half-sectors.

In addition, the invention relates to an electric machine for a vehicle and to a vehicle.

Such a rotor is known for example from document DE 10 2012 219 175 A1, which relates to a rotating electric machine. This comprises a rotor with embedded permanent magnet (IPM), in which a plurality of sets of permanent magnets are embedded in such a way that magnets from each set comprise a pair of permanent magnets which are situated in a V-shaped arrangement opening in the direction of an outer circular circumferential face.

Such a rotor is characterised by a high saliency ratio, whereby a high reluctance torque is generated. The V-shaped arrangement of the permanent magnets, however, leads to a distorted magnetic air gap field, which deviates from a desired sinusoidal form.

The object of the invention is consequently to describe a possibility for improving the distribution of the magnetic air-gap field of an electric machine, wherein at the same time a high reluctance torque may be generated.

In order to achieve this object, in accordance with the invention it is provided in a rotor of the kind described at the outset that an outer radius of the rotor lamination stack in a particular sector has a pair of local minimum values which are formed symmetrically to one another with respect to the plane of symmetry in a half-sector of the sector.

The invention is based on the consideration of adapting the outer form of the rotor lamination stack by the formation of the local minimum values of the outer radius, such that a distribution of a magnetic air-gap field approximates a desired sinusoidal course. It has been found that in a conventional rotor with constant outer radius a substantially step-like air-gap field is generated by the V-shaped arrangement of the permanent magnets, wherein in the region of leakage fluxes a trapezoidal course is additionally provided. By changing the outer radius selectively, this course of the air-gap field may be counteracted, so that the air-gap field in the rotor according to the invention is advantageously approximated to the desired sinusoidal course and at the same time a high reluctance torque may be generated.

The permanent magnets typically extend along the rotor in the axial direction. A permanent magnet typically has a cuboid form. A cross-sectional area, the surface normal of which runs in the axial direction, of a permanent magnet typically has a long side and a short side, wherein the long sides are open towards the outer radius of the rotor lamination stack. The rotor lamination stack for each permanent magnet expediently has a magnet pocket penetrating the rotor lamination stack in the axial direction and within which one of the permanent magnets is arranged. Due to the magnet pockets, clearances may also be formed in the rotor, in particular adjacently to the short sides of the permanent magnets. Each sector typically forms a pole of the rotor. The plane of symmetry extends typically in the radial and axial direction. The symmetry of the half-sectors also is not understood insofar as the rotor lamination stack itself has to be formed symmetrically in the half-sectors. For example, it is conceivable that an opening penetrating the rotor does not have symmetry of the half-sectors, in order to secure a shaft within the opening.

In the rotor according to the invention it is particularly preferred if a maximum value of the outer radius over a sector is situated on the plane symmetry. In this region, there should lie a maximum of the approximately sinusoidal air-gap field, such that the rotor may have here the maximum value of its outer radius. In the case of the rotor according to the invention, a local maximum value of the outer radius is typically formed at the boundary between two adjacent sectors.

It has been determined by way of experimentation that a local minimum value of the pair is situated advantageously within a partial sector of the half-sector, which in the circumferential direction is delimited by the position of a radially outermost point of the permanent magnet assembly and by a position of an outermost point of the permanent magnet assembly in the circumferential direction.

In accordance with a particularly preferred embodiment of the rotor according to the invention, it is provided that a second permanent magnet assembly is arranged in a sector, wherein a radially innermost point of the second permanent magnet assembly lies radially further outward than a radially innermost point of the first permanent magnet assembly, wherein the outer radius of the rotor lamination stack has a second pair of local minimum values, which are formed symmetrically to one another with respect to the plane of symmetry in a half-sector of the sector and are situated closer to the plane of symmetry in the circumferential direction than the first pair of local minimum values. The optimised air-gap field may thus also be realised with more complex permanent magnet structures within a sector.

In this case, it is preferred if a local maximum value, in particular precisely one local maximum value, is situated in a half-sector between the minimum value of the first pair and the minimum value of the second pair.

In accordance with a particularly preferred alternative, it is provided that the second permanent magnet assembly comprises two further permanent magnets arranged in a V-shape symmetrically with respect to the plane of symmetry of the sector. A permanent magnet of the second permanent magnet assembly typically has a smaller cross-sectional area than a permanent magnet of the first permanent magnet assembly.

In accordance with a further preferred alternative, it is provided that the second permanent magnet assembly comprises a permanent magnet arranged orthogonally to the plane of symmetry. The permanent magnet is consequently situated in both half-sectors.

Within the scope of the invention it has also been identified that the course of the outer radius of the rotor may also be described analytically. It is thus preferred that the course of the outer radius, in a region close to the plane of symmetry in respect of a minimum value, follows the function $$r = R_{max} + \delta_0 - \delta(x)$$

-continued with $$\delta(x) = \frac{\alpha}{\cos\left(\frac{\pi}{\tau_p}x\right)}$$

Alternatively or additionally, the course of the outer radius in a region far from the plane of symmetry in respect of a minimum value may follow the function $$r = R_{max} + \delta_0 - \delta(x)$$

with $$\delta(x) = \beta \frac{1 - \frac{2}{\tau_p}x}{\cos\left(\frac{\pi}{\tau_p}x\right)}$$

In this case r describes the value of the outer radius, $R_{max}$ describes the maximum value of the outer radius, $\delta_0$ describes a constant or a minimum of the air gap between the rotor and a stator of the electric machine.

$\alpha$, $\beta$ each describe a positive proportionality factor $\tau_p$ describes a distance in the circumferential direction between the planes of symmetry of adjacent sectors, and x describes a coordinate in the circumferential direction with x=0 at the position of the plane of symmetry and $$x = \frac{\tau_p}{2}$$

at a central position between the planes of symmetry of adjacent sectors.

In principle; it may be provided in the rotor according to the invention that the, or a, pair of local minimum values is situated at a position in the circumferential direction where a magnetic flux leakage strength increases.

The object forming the basis of the invention is also achieved by an electric machine for a vehicle, comprising a stator and a rotor according to the invention mounted rotatably within the stator.

The object forming the basis of the invention is lastly also achieved by a vehicle comprising an electric machine according to the invention which is designed to drive the vehicle.

Figure 2:
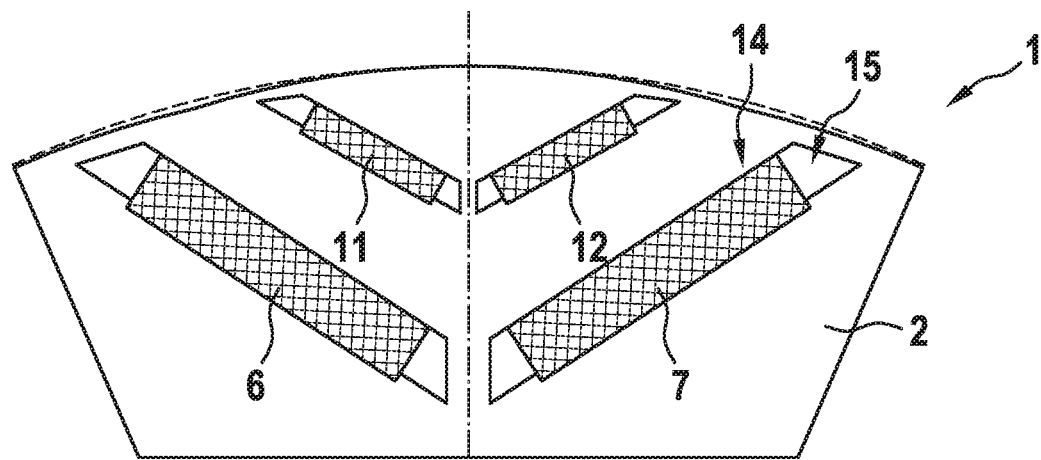
Figure 3:
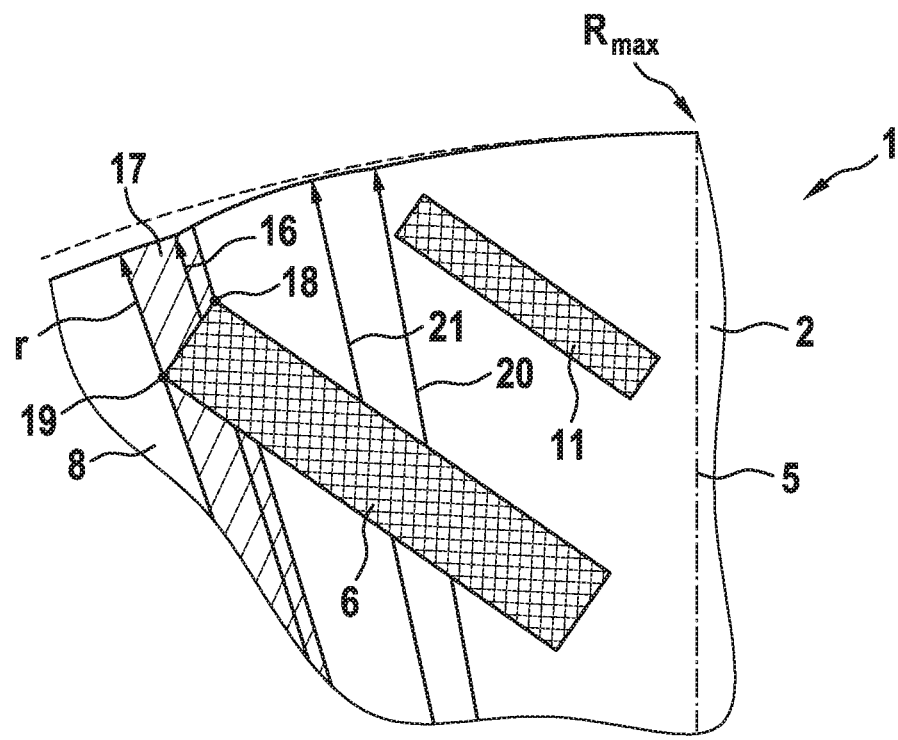
Figure 4:
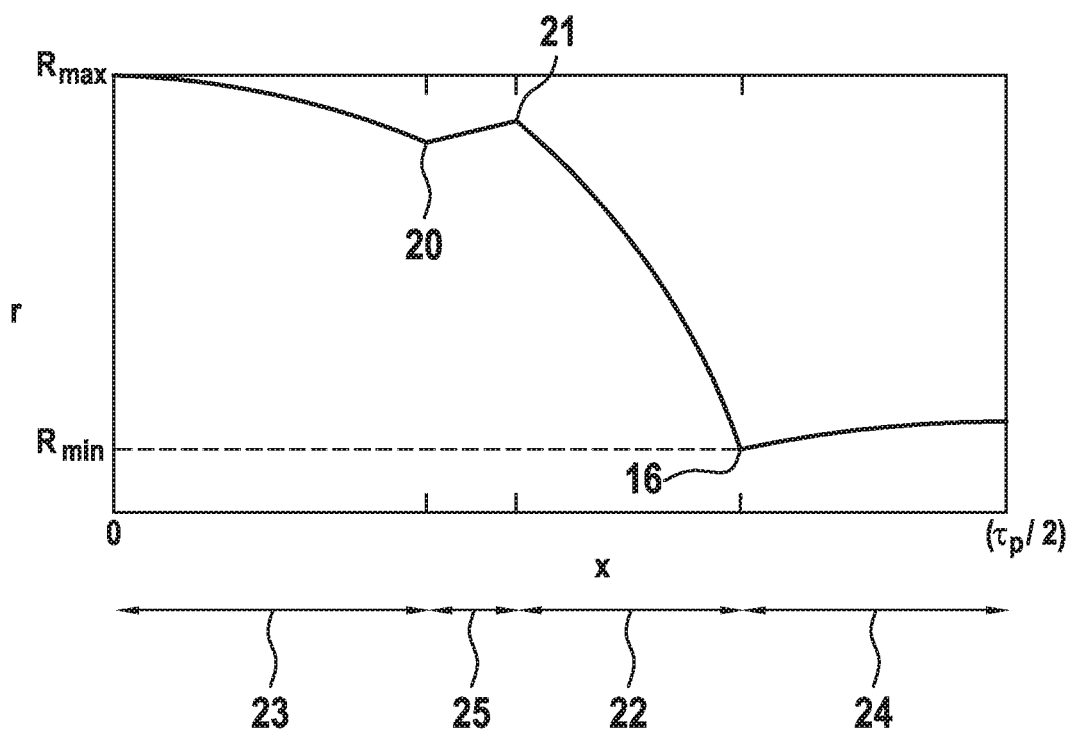
Figure 5:
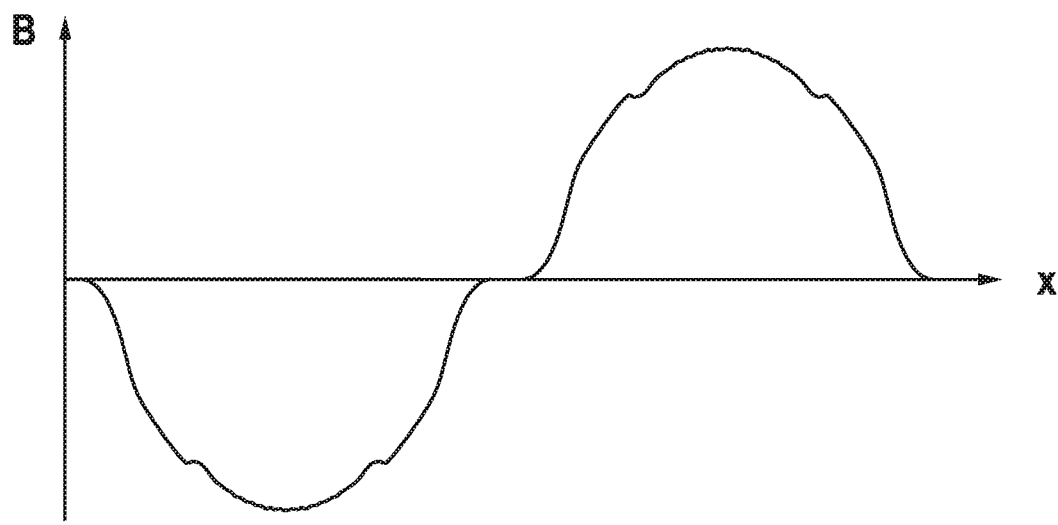
Figure 6:
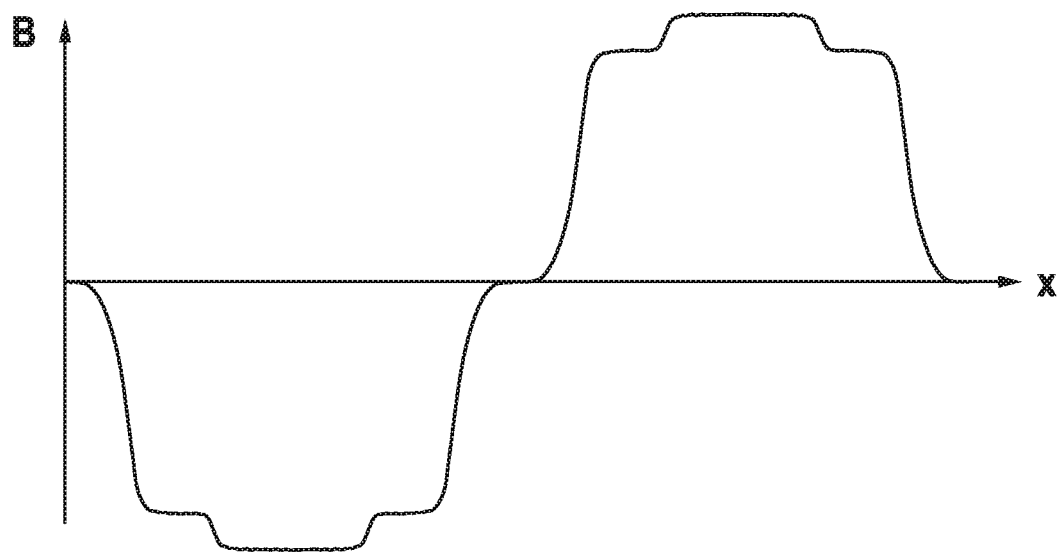
Figure 7:
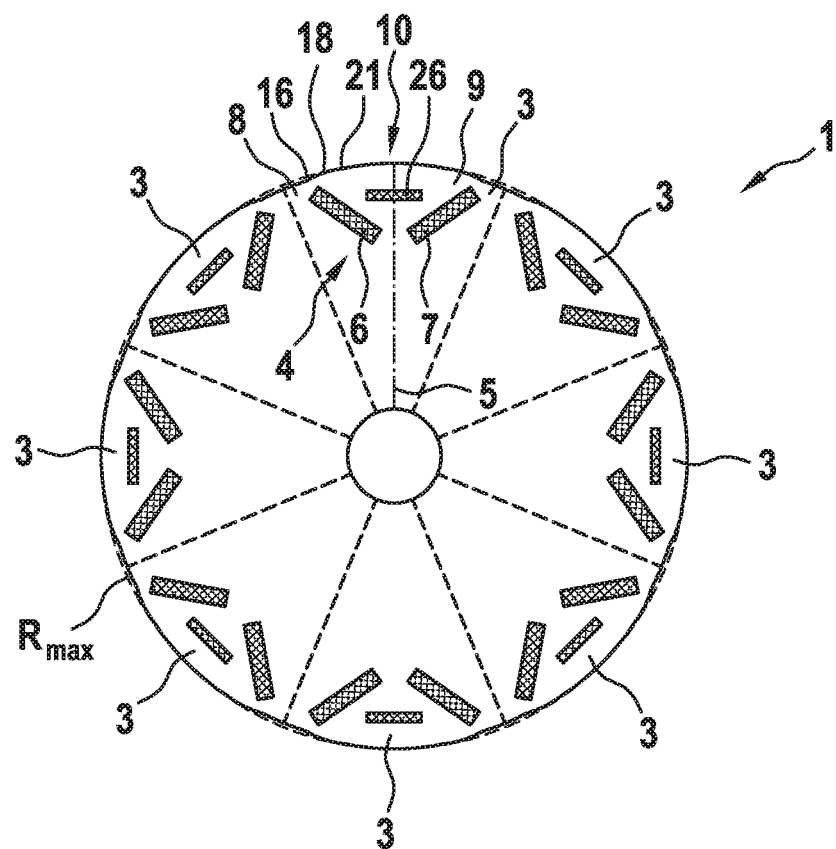
Figure 8:
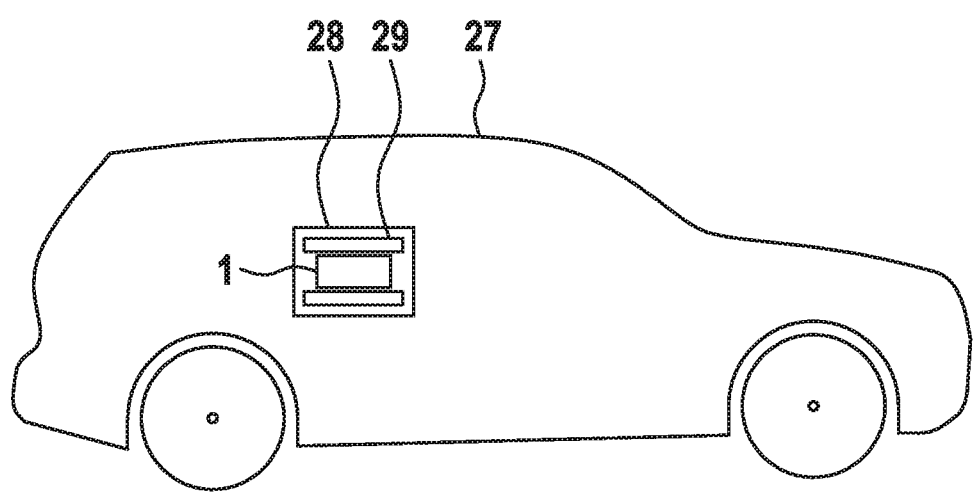

Further advantages and details of the present invention will become clear from the exemplary embodiments described hereinafter and also the drawings. These are schematic illustrations and show:

FIG. 1 a sectional basic illustration of a first exemplary embodiment of the rotor according to the invention;

FIG. 2 a detailed view of a sector of the rotor shown in FIG. 1;

FIG. 3 a basic illustration of a half-sector of the rotor shown in FIG. 1;

FIG. 4 a graph of an outer radius of the rotor over a coordinate in the circumferential direction;

FIG. 5 a graph of the magnetic flux density over the coordinate in the circumferential direction of the rotor;

FIG. 6 a graph corresponding to FIG. 5 of a conventional rotor;

FIG. 7 a sectional basic illustration of a further exemplary embodiment of the rotor according to the invention; and FIG. 8 a basic diagram of an exemplary embodiment of the vehicle according to the invention with an exemplary embodiment of the electric machine according to the invention.

FIG. 1 shows a sectional basic illustration of a first exemplary embodiment of a rotor 1.

The rotor 1 comprises a rotor lamination stack 2, which is divided into a total of eight sectors 3. In this case, each point of the rotor 1 in the shown cross-sectional illustration is associated with precisely one sector 3. Consequently, two adjacent sectors 3 border one another directly. In each sector 3 there is arranged a first permanent magnet assembly 4 having two permanent magnets 6, 7 positioned in a V-shape symmetrically with respect to a plane of symmetry 5. The plane of symmetry 5 extends in the axial and radial direction of the rotor 1 and divides the sector 3 into two half-sectors 8, 9. In this case, the permanent magnet 6 is in the half-sector 8 and the permanent magnet 7 is in the half-sector 9. Each sector 3 forms a pole of the rotor 1, and the number of sectors 3 or poles is merely exemplary.

Furthermore, the rotor 1 comprises a second permanent magnet assembly 10, which comprises two further permanent magnets 11, 12 arranged in a V-shape symmetrically with respect to the plane of symmetry 5 of the sector 3, wherein the permanent magnet 11 is arranged in the half-sector 8 and the permanent magnet 12 is arranged in the haft-sector 9. A radially innermost point of the second permanent magnet assembly or of a permanent magnet 11, 9 lies radially further outward than a radially innermost point of the first permanent magnet assembly 4 or the permanent magnets 6, 7.

In addition, the rotor 1 has a through-opening 13 for a shaft (not shown) extending in the centre point in the axial direction.

FIG. 2 shows a detailed view of a sector 3 of the rotor 1 representative for all further sectors 3. Shown are permanent magnets 6, 7, 11, 12 arranged each in a magnet pocket 14 so that long sides of the permanent magnets 6, 7, 11, 12 touch the rotor lamination stack 2. The magnet pockets extending as through-openings in the axial direction are each larger than a cross-sectional area of the received permanent magnet 6, 7, 11, 12, so that clearances 15 are formed in the rotor 1 on the short sides of said magnets.

FIG. 3 shows a basic diagram of the half-sector 8 of the sector 3. The basic diagram is also considered to be representative, in a mirror image, for the half-sector 9 of the sector 3 and the corresponding half-sectors 8, 9 of the other sectors 3.

An outer radius r of the rotor lamination stack 2 has a first local minimum value 16 in the half-sector 8. Consequently, due to the symmetry of the half-sectors 8, 9, a first pair of local minimum values is formed in a sector 3. The first local minimum value 16 is situated within a sub-sector 17 (shown by hatching in FIG. 3) of the half-sector 8, which sub-sector is delimited in the circumferential direction by the position of a radially outermost point 18 of the first permanent magnet assembly 4 or of the permanent magnet 6 and by the position of an outermost point 19 of the permanent magnet in the circumferential direction.

The outer radius r in the half-sector 8 also has a second local minimum value 20, which in the circumferential direction is situated closer to the plane of symmetry 5 than the first local minimum value 16. A local maximum value 21 of the outer radius r is situated between the minimum values 16, 20. For the sake of completeness, it should be mentioned that, due to the symmetry of the half-sectors, a second pair of local minimum values and a pair of local maximum values are thus formed.

In addition, the outer radius r over the entire sector 3 has a global maximum value $R_{max}$, which in the drawing is shown by dashed line over the entire circumference of the rotor 1. A further local maximum value forms the boundary between two adjacent sectors 3.

FIG. 4 is a graph of the outer radius r of the rotor 1 over a coordinate x in the circumferential direction. The coordinate in this case describes the distance from the plane of symmetry, wherein x=0 at the position of the plane of symmetry and the value of the coordinate is $x=\tau_p/2$ at the boundary between two adjacent sectors 3. In this case, $\tau_p$ describes the pole width of the rotor 1.

In a region 22, which is close to the plane of symmetry with respect to the first local minimum value 16 and which extends from the position of the local maximum value 21 to the position of the first local minimum value 16, and in a region 23, which is close to the plane of symmetry with respect to the second local minimum value 20 and which extends from the position of the plane of symmetry 5 to the position of the second local minimum value 20, the course of the outer radius r follows the function $$r = R_{max} + \delta_0 - \delta(x)$$

with $$\delta(x) = \frac{\alpha}{\cos\left(\frac{\pi}{\tau_p}x\right)}$$

wherein α describes a proportionality factor for a region 22, 23 and $\delta_0$ describes a minimum value of an air gap between the rotor 1 and a stator 29 (see FIG. 8). In other words, $\delta_0$ describes the minimum air gap in relation to a stator inner bore.

In a region 24, which is far from the plane of symmetry with respect to the first local minimum value 16 and which extends from the position of the local minimum value 16 to the boundary to the adjacent sector 3, and in a region 25, which is far from the plane of symmetry with respect to the second local minimum value 20 and which extends from the position of the second local minimum value 20 to the local maximum value 21, the course of the outer radius r follows the function $$r = R_{max} + \delta_0 - \delta(x)$$

with $$\delta(x) = \beta \frac{1 - \frac{2}{\tau_p}x}{\cos\left(\frac{\pi}{\tau_p}x\right)}$$

wherein β describes a proportionality factor for a region 24, 25.

FIG. 5 and FIG. 6 each show a graph of the magnetic flux density B over the coordinate x. In this case, FIG. 5 relates to the magnetic air-gap field of an electric machine with the exemplary embodiment of the rotor 1, and FIG. 6 relates to the magnetic air-gap field of an electric machine with a rotor which corresponds to the rotor 1 and the outer radius of which corresponds constantly to the value $R_{max}$.

It can be seen that the magnetic air-gap field shown in FIG. 5 is approximated much more closely to a sinusoidal course than that shown in FIG. 6. This results in the fact that the positions in the circumferential direction of the minimum values 16, 20 are selected such that the steep rise of the magnetic flux leakage at these positions and the step-like course are taken into consideration.

FIG. 7 shows a basic diagram of a second exemplary embodiment of a rotor 1 which corresponds to the first exemplary embodiment unless otherwise described hereinafter. In this case, equivalent or functionally equivalent components are provided with identical reference signs.

In the rotor 1 according to the second exemplary embodiment, the second permanent magnet assembly 10 comprises a permanent magnet 26 arranged orthogonally to the plane of symmetry 5. Also with a structure of this kind of permanent magnets 6, 7, 26, an air-gap field approximated to the sinusoidal course may be produced by the formation of local minimum values 16, 21 or local maximum values 18, wherein the course of the outer radius r here is to be adapted in relation to the illustration in FIG. 4 or the functions for the outer radius r here are to be adapted to the deviating leakage field.

FIG. 8 shows a basic diagram of an exemplary embodiment of a vehicle 27, comprising an exemplary embodiment of an electric machine 28. The electric machine 28 has a stator 29 and a rotor 1 arranged within the stator 29 according to any one of the previously described exemplary embodiments. Electric machine 28 is designed to drive the vehicle 27. The vehicle may be an electric vehicle (BEV) or a hybrid vehicle, accordingly.

The invention claimed is:

1. A rotor for an electric machine, comprising:
a rotor lamination stack divided into a plurality of sectors;
a permanent magnet assembly arranged in each of the plurality of sectors and including two permanent magnets positioned in a V-shape symmetrically with respect to a plane of symmetry dividing each of the plurality of sectors into two half-sectors,
wherein an outer radius (r) of the rotor lamination stack in each of the plurality of sectors has a first pair of local minimum values, symmetrically to one another with respect to the plane of symmetry, at first positions,
the outer radius (r) of the rotor lamination stack in each of the plurality of sectors increases from each of the first positions to a boundary between two of the plurality of sectors adjacent to one another and has a first local maximum value at the boundary between two of the plurality of sectors adjacent to one another,
a maximum value ($R_{max}$) of the outer radius (r) over each of the plurality of sectors is situated on the plane of symmetry,
the outer radius (r) of the rotor lamination stack in each of the plurality of sectors has a second pair of local minimum values, symmetrically to one another with respect to the plane of symmetry, at second positions positioned between the first positions in a circumferential direction,
the outer radius (r) of the rotor lamination stack in each of the plurality of sectors decreases from the plane of symmetry to each of the second positions to have each of the second pair of local minimum values, and
the outer radius (r) of the rotor lamination stack in each of the plurality of sectors decreases from the boundary between two of the plurality of sectors adjacent to one another to each of the first positions to have each of the first pair of local minimum values.

2. The rotor according to claim 1, wherein
the first pair of local minimum values is situated within a partial sector of one of the half-sectors, and
the partial sector is delimited in the circumferential direction by a position of an outermost point of the permanent magnet assembly in a radial direction and by a position of an outermost point of the permanent magnet assembly in the circumferential direction.

3. The rotor according to claim 1, further comprising
a second permanent magnet assembly arranged in each of the plurality of sectors,
wherein an innermost point of the second permanent magnet assembly in a radial direction is situated outside an innermost point of the first permanent magnet assembly in the radial direction, and
each of the second pair of local minimum values is situated closer to the plane of symmetry in the circumferential direction relative to each of the first pair of local minimum values.

4. The rotor according to claim 3, wherein
a second local maximum value is situated in each of the half-sectors between each of the first pair of local minimum values and each of the second pair of local minimum values.

5. The rotor according to claim 3, wherein
the second permanent magnet assembly comprises another two permanent magnets arranged in a V-shape symmetrically with respect to the plane of symmetry.

6. The rotor according to claim 3, wherein
the second permanent magnet assembly comprises a permanent magnet arranged orthogonally to the plane of symmetry.

7. The rotor according to claim 1, wherein a course of the outer radius
in a region close to the plane of symmetry with respect to a minimum value follows the function $$r = R_{max} + \delta_0 - \delta(x)$$

with $$\delta(x) = \frac{\alpha}{\cos\left(\frac{\pi}{\tau_p}x\right)}$$

and/or
in a region far from the plane of symmetry with respect to a minimum value follows the function $$r = R_{max} + \delta_0 - \delta(x)$$

with $$\delta(x) = \beta \frac{1 - \frac{2}{\tau_p}x}{\cos\left(\frac{\pi}{\tau_p}x\right)}$$

wherein
r describes a value of the outer radius,
$R_{max}$ describes a maximum value of the outer radius,
$\delta_0$ describes a constant,
$\alpha, \beta$ each describe a positive proportionality factor,
$\tau_p$ describes a distance in the circumferential direction between the planes of symmetry of the plurality of sectors adjacent to one another, and
x describes a coordinate in the circumferential direction with x=0 at a position of the plane of symmetry and $$x = \frac{\tau_p}{2}$$

at a central position between the planes of symmetry of the plurality of sectors adjacent to one another.

8. The rotor according to claim 1, wherein
at least one of the first pair of local minimum values and the second pair of local minimum values is situated at a position in the circumferential direction where a magnetic leakage flux has a local maximum.

9. An electric machine for a vehicle, comprising
a stator and the rotor according to claim 1 mounted rotatably within the stator.

10. A vehicle, comprising
the electric machine according to claim 9, which is designed to drive the vehicle.

11. The rotor according to claim 1, wherein
the outer radius (r) of the rotor lamination stack in each of the plurality of sectors has a second local maximum value at a third position between each of the first positions and each of the second positions, and
the outer radius (r) of the rotor lamination stack in each of the plurality of sectors increases from each of the first positions to the third position and increases from each of the second positions to the third position to have the second local maximum value.

* * * * *